US010523549B1

(12) United States Patent
Belikovetsky et al.

(10) Patent No.: US 10,523,549 B1
(45) Date of Patent: Dec. 31, 2019

(54) METHOD AND SYSTEM FOR DETECTING AND CLASSIFYING NETWORKED DEVICES

(71) Applicant: CYBERTOKA Ltd., Tel-Aviv (IL)

(72) Inventors: Sofia Belikovetsky, Petach Tikva (IL); Moty Zaltsman, Sde Warburg (IL)

(73) Assignee: CYBERTOKA LTD, Tel Aviv (IL)

( * ) Notice: Subject to any disclaimer, the term of this patent is extended or adjusted under 35 U.S.C. 154(b) by 0 days.

(21) Appl. No.: 16/429,001

(22) Filed: Jun. 2, 2019

(51) Int. Cl.
*H04L 12/26* (2006.01)
*H04L 29/08* (2006.01)

(52) U.S. Cl.
CPC ............. *H04L 43/12* (2013.01); *H04L 67/02* (2013.01); *H04L 67/141* (2013.01)

(58) Field of Classification Search
CPC ......... H04L 43/12; H04L 43/14; H04L 43/18; H04L 67/02; H04L 67/141
See application file for complete search history.

(56) References Cited

U.S. PATENT DOCUMENTS

| | | | | |
|---|---|---|---|---|
| 6,795,402 B1 * | 9/2004 | Richardson | ............. | H04L 43/18 370/241 |
| 8,248,928 B1 * | 8/2012 | Wang | ................... | H04L 43/026 370/230 |
| 9,444,839 B1 * | 9/2016 | Faulkner | ............. | H04L 63/1466 |
| 9,495,188 B1 * | 11/2016 | Ettema | ................ | G06F 9/45533 |
| 9,860,208 B1 * | 1/2018 | Ettema | ................ | G06F 21/602 |
| 9,882,929 B1 * | 1/2018 | Ettema | ................ | H04L 63/145 |
| 9,935,887 B1 * | 4/2018 | Maharia | ............... | H04L 47/365 |
| 10,044,675 B1 * | 8/2018 | Ettema | ............... | H04L 63/0227 |
| 2003/0093709 A1 * | 5/2003 | Ogawa | ............... | G06F 11/0709 714/4.3 |
| 2004/0193918 A1 * | 9/2004 | Green | ................. | H04L 63/1433 726/22 |
| 2004/0255033 A1 * | 12/2004 | Edney | .................. | H04L 12/18 709/229 |
| 2005/0144505 A1 * | 6/2005 | Takeuchi | ............ | H04L 41/0631 714/4.12 |
| 2006/0285579 A1 * | 12/2006 | Rhee | .................... | H04B 1/7156 375/132 |
| 2007/0086486 A1 * | 4/2007 | Park | ...................... | H04L 29/06 370/474 |
| 2007/0124801 A1 * | 5/2007 | Thomas | .............. | H04L 63/1408 726/3 |
| 2010/0262467 A1 * | 10/2010 | Barnhill, Jr. | ........ | H04L 12/2809 709/223 |
| 2010/0305990 A1 * | 12/2010 | Tyree | ..................... | G06Q 10/06 705/7.36 |
| 2012/0079101 A1 * | 3/2012 | Muppala | ............. | H04L 63/0236 709/224 |
| 2012/0084605 A1 * | 4/2012 | Shilon | ................... | H04L 43/12 714/33 |
| 2012/0106538 A1 * | 5/2012 | Ai | ........................ | H04W 56/00 370/350 |
| 2013/0246606 A1 * | 9/2013 | Branch | ............... | H04L 41/0853 709/224 |

(Continued)

FOREIGN PATENT DOCUMENTS

| | | | | |
|---|---|---|---|---|
| CN | 104322017 A | * | 1/2015 | |
| EP | 2227052 A1 | * | 9/2010 | .......... H04W 28/065 |
| WO | WO-2014101047 A1 | * | 7/2014 | ............. H04L 43/00 |

*Primary Examiner* — Kostas J Katsikis

(74) *Attorney, Agent, or Firm* — Mark M. Friedman

(57) ABSTRACT

Systems and methods are provided for the discovery and classification of Internet of Things (IoT) devices on networks.

20 Claims, 4 Drawing Sheets

(56) References Cited

U.S. PATENT DOCUMENTS

| | | | |
|---|---|---|---|
| 2014/0053265 A1* | 2/2014 | Crowley | H04L 43/12 726/22 |
| 2014/0270157 A1* | 9/2014 | Youd | G06F 21/64 380/44 |
| 2015/0149812 A1* | 5/2015 | Arisoylu | G06F 11/0793 714/4.1 |
| 2015/0195727 A1* | 7/2015 | Van Oost | H04L 43/12 370/252 |
| 2015/0382201 A1* | 12/2015 | Chou | H04W 24/08 370/329 |
| 2016/0044032 A1* | 2/2016 | Kim | H04L 63/0876 726/5 |
| 2016/0050589 A1* | 2/2016 | Safavi | H04W 36/0033 455/436 |
| 2016/0099853 A1* | 4/2016 | Nedeltchev | H04L 43/0852 370/253 |
| 2016/0142260 A1* | 5/2016 | Cafarelli | H04L 41/12 370/250 |
| 2016/0142304 A1* | 5/2016 | Alawani | H04L 43/12 370/389 |
| 2016/0142305 A1* | 5/2016 | Alawani | H04L 45/74 370/389 |
| 2016/0234284 A1* | 8/2016 | Bao | G06F 16/95 |
| 2016/0337206 A1* | 11/2016 | Bugenhagen | H04L 67/34 |
| 2016/0366040 A1* | 12/2016 | Nampelly | H04L 43/12 |
| 2017/0006494 A1* | 1/2017 | Wang | H04W 28/0268 |
| 2017/0064717 A1* | 3/2017 | Filsfils | H04L 47/17 |
| 2017/0078322 A1* | 3/2017 | Seiver | H04L 43/0876 |
| 2017/0094706 A1* | 3/2017 | Kim | H04W 4/70 |
| 2017/0150516 A1* | 5/2017 | Stephenne | H04W 24/10 |
| 2017/0237645 A1* | 8/2017 | Shanbhag | H04L 67/2814 370/250 |
| 2017/0272463 A1* | 9/2017 | Balcik | G06F 21/577 |
| 2018/0091388 A1* | 3/2018 | Levy | H04L 47/30 |
| 2018/0139219 A1* | 5/2018 | Sabata | H04L 63/1416 |
| 2019/0044824 A1* | 2/2019 | Yadav | H04L 43/04 |
| 2019/0052552 A1* | 2/2019 | Holbrook | H04L 43/026 |
| 2019/0052556 A1* | 2/2019 | Duda | H04L 43/0817 |
| 2019/0132377 A1* | 5/2019 | Hulick, Jr. | H04L 67/02 |
| 2019/0296988 A1* | 9/2019 | Bhandari | H04L 45/22 |

* cited by examiner

METHOD AND SYSTEM FOR DETECTING AND CLASSIFYING NETWORKED DEVICES

TECHNICAL FIELD

The present invention relates to methods and systems for identifying devices on a network.

BACKGROUND OF THE INVENTION

The rapid advance in technology has created networks that extend beyond standard devices to also contain a plethora of different types of devices, which perform various functions, are manufactured by multitudes of manufacturers, and run software ranging from proprietary to open source. The devices, include, for example, home appliances, vehicle appliances, appliances that provide network services, security cameras, manufacturing appliances, personal devices, such as watches, bracelets, medical devices, sensors and actuators as well as computer devices, such as servers, desktop computers (desktops), laptop computers (laptops), tablet computers (Tablets), smartphones and other mobile devices.

As there are so many devices, their detection and classification is time consuming, and is typically performed manually, and requires specialists performing complicated work, making the process labor intensive and costly. Also, as humans are involved, the process is subject to inefficiencies as well as human error, such that it is inefficient.

SUMMARY

The present invention is directed to computerized methods and systems for efficiently and rapidly discovering and classifying devices along a network, which presently, can only be done manually.

Embodiments of the invention are directed to a computer-implemented method, for detecting a device on a network. The method comprises: probing the network to obtain at least one network parameter from at least one device along the network; receiving at least one response to the probing the network, the at least one response including a payload of a content length, the content length defining the at least one network parameter; performing an initial classification into at least one category of the at least one device, based on the content length of the at least one response from the at least one device; and, performing a secondary classification on the at least one device in the at least one initial category based on data returned by the at least one device after issuing at least one application protocol specific request to the at least one device.

Optionally, the computer-implemented method is such that the probing the network includes: sending at least one active request to ports associated with the at least one device to establish communication with the at least one device.

Optionally, the computer-implemented method is such that the at least one active request includes one or more Hypertext Transfer Protocol (HTTP) requests.

Optionally, the computer-implemented method is such that the probing the network additionally includes: sending at least one GET request to the ports associated with the at least one device.

Optionally, the computer-implemented method is such that in response to the GET request being received, querying the at least one device through the associated port with protocols for identifying the device by its type.

Optionally, the computer-implemented method is such that the probing includes applying probing tools to obtain the at least one network parameter.

Optionally, the computer-implemented method is such that the probing includes one or more of: a) applying probing tools; b) sniffing; or c) applying log analyzers, to obtain the at least one network parameter.

Optionally, the computer-implemented method is such that the applying log analyzers to obtain the at least one network parameter includes analyzing logs generated by one or more of: routers, wireless access points, security gateways, firewalls, packet filters, load balancers, Domain Name Servers (DNS), Dynamic Host Configuration Protocol (DHCP) servers, and network proxies.

Optionally, the computer-implemented method is such that the content length is determined by at least one of: counting the bytes in the payload of the at least one response; or obtaining the content length from a content-length portion of a header of the at least one response.

Optionally, the computer-implemented method is such that the performing the initial classification further includes establishing a classification for the at least one device by one or more of: determining the application protocol used by the at least one device; determining the function of the application protocol for the at least one device; determining whether the content length of the probing response is within a predetermined range; and, the content of the probing response.

Optionally, the computer-implemented method is such that the application specific protocol request includes a Hypertext Transfer Protocol (HTTP) request.

Optionally, the computer-implemented method is such that the HTTP request is for a resource associated with the at least one device.

Optionally, the computer-implemented method is such that the secondary classification is based on website content received from the at least one response to the probing the network.

Optionally, the computer-implemented method is such that the secondary classification additionally comprises: sending one or more of: 1) Transmission Control Protocol (TCP) requests containing vendor specific data, or 2) HTTP requests to vendor specific Uniform Resource Locator (URL), to determine the type of the at least one device from the website associated with the at least one device.

Embodiments of the invention are directed to a computer system for detecting and classifying a networked device. The computer system comprises: a non-transitory storage medium for storing computer components; and, a computerized processor for executing the computer components. The computerized components comprise: a module for probing the network to obtain at least one network parameter from at least one device along the network; a module for receiving at least one response to the probing the network, the at least one response including a payload of a content length, the content length defining the at least one network parameter; and, a classifier module (e.g., classifier). The classifier module is configured for performing an initial (primary) classification (e.g., by a primary classifier) into at least one category of the at least one device, based on the content length of the at least one response from the at least one device; and, for performing a secondary classification (e.g., by a secondary classifier) on the at least one device in the at least one initial category based on data returned by the at least one device after issuing at least one application protocol specific request to the at least one device.

Optionally, the computer system is such that the module for probing the network includes one or more of: a probing tool, a sniffer, and a log analyzer.

Optionally, the computer system is such that the module for receiving the at least one response to the probing the network is configured for determining the content length by at least one of: counting the bytes in the payload of the at least one response; or obtaining the content length from a content-length portion of a header of the at least one response.

Optionally, the computer system is such that the classifier module is additionally configured to perform the initial classification by establishing a classification for the at least one device by one or more of: determining the application protocol used by the at least one device; determining the function of the application protocol for the at least one device; determining whether the content length of the probing response is within a predetermined range; and, the content of the probing response.

Optionally, the computer system is such that the classifier module is additionally configured for performing the secondary classification based on website content received from the at least one response to the probing the network.

Embodiments of the invention are directed to a computer usable non-transitory storage medium having a computer program embodied thereon for causing a suitably programmed system to discover and classify a device on a network, by performing the following steps when such program is executed on the system. The steps comprise: probing the network to obtain at least one network parameter from at least one device along the network; receiving at least one response to the probing the network, the at least one response including a payload of a content length, the content length defining the at least one network parameter; performing an initial classification into at least one category of the at least one device, based on the content length of the at least one response from the at least one device; and, performing a secondary classification on the at least one device in the at least one initial category based on data returned by the at least one device after issuing at least one application protocol specific request to the at least one device.

This document references terms that are used consistently or interchangeably herein. These terms, including variations thereof, are as follows.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

URL (Uniform Resource Locator) is a reference to a resource that specifies the location of the resource on a computer network and a mechanism for retrieving it, such as an address of a specific Web site or file on the Internet.

An "application" or "software application", includes executable software, and optionally, any graphical user interfaces (GUI), through which certain functionalities can be implemented.

A "client" is an application that runs on a computer, workstation or the like and relies on a server to perform some of its operations or functionality.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1:
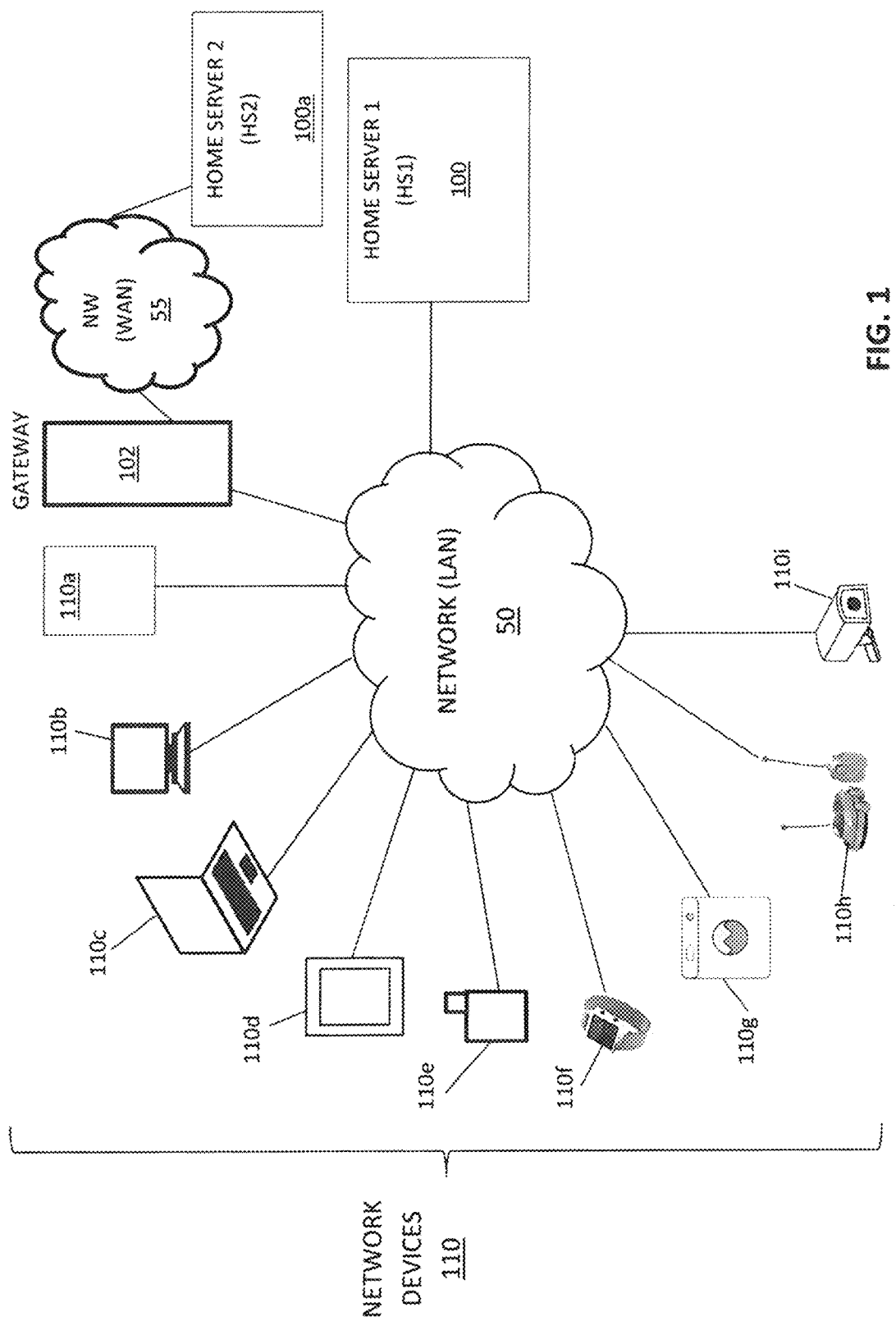
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

FIG. 1 shows an example environment in which the invention is performed. A home server 1 (HS1) 100, also known as a main server, represents an example system 100', for performing the invention, and links to a network 50, which is, for example, a local area network (LAN), such as an enterprise network. A second home or main server (HS2) 100a links to network 55, which is a wide area network (WAN), including public networks such as the Internet. The home server 100a sits behind a gateway 102. The gateway 102, includes, for example, firewalls and other inspection devices. The gateway 102 links to the network 50.

Various devices 110 link to the network 50. The devices 110a-110i shown are examples of multitudes of networked devices which are detectable, and include Internet of Things (IoT) devices, the terms "devices" and "IoT devices" used interchangeably herein to refer to the example devices 110a-110i. These devices include, for example, servers 110a, desktop computers 110b, laptop computers (laptops) 110c, tablet computers, such as iPads® 110d, cellular telephones 110e including smartphones, smart watches 110f and bracelets (e.g., Fitbits®), appliances 110g, remote controllers 110h, security cameras 110i, and other Internet of Things (IoT) devices. Each of the devices 110a-110i exposes one or more ports that enable connecting to the device.

The networks LAN 50 and WAN 55, although shown as a single network, may be a combination of networks and/or multiple networks including, for example, data networks, cellular networks, communications networks, and the like. "Linked" as used herein, includes both wired and/or wireless links, either direct or indirect, such that the computers, including, servers, components and the like, are in electronic and/or data communications with each other.

Figure 2:
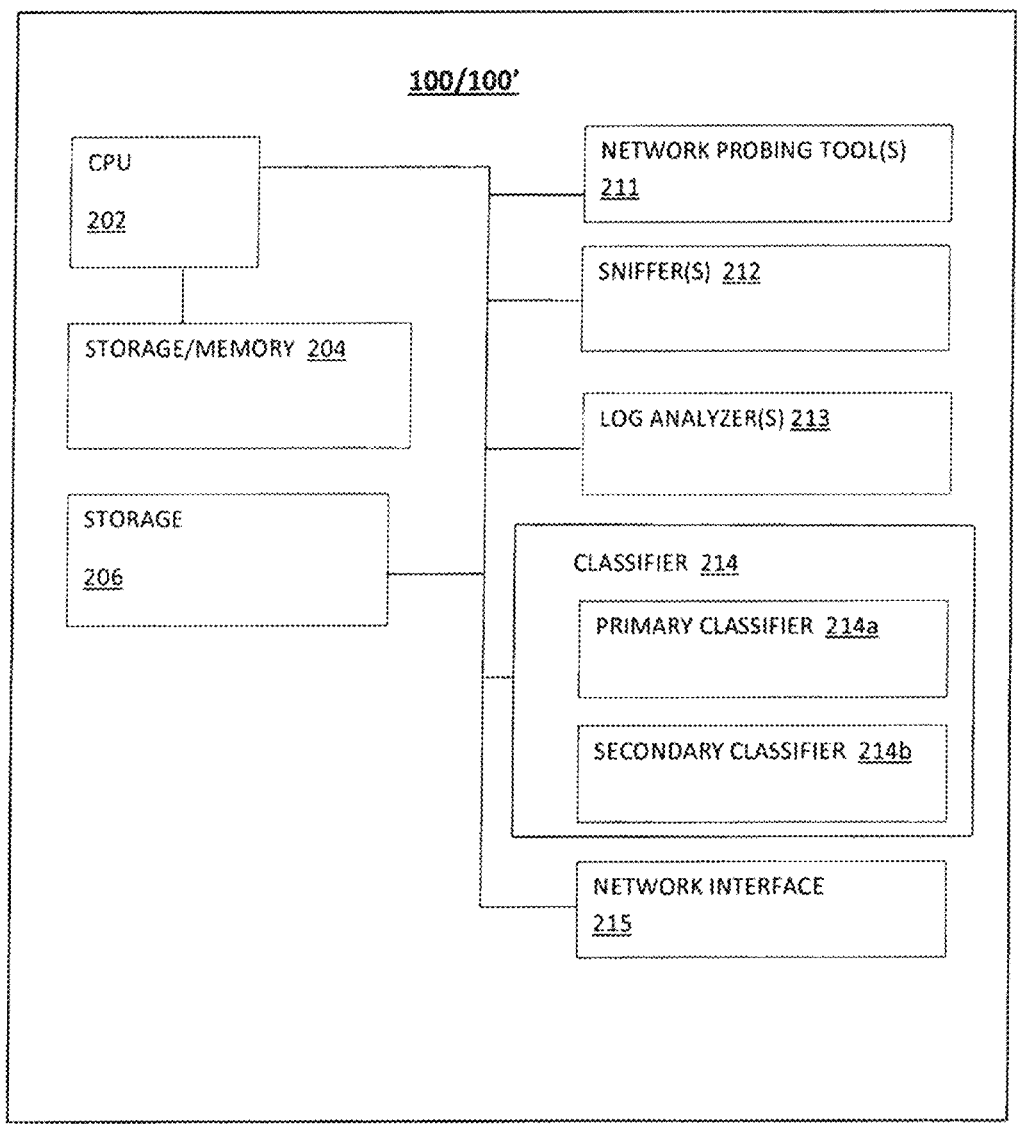
FIG. 2 is a diagram of an example architecture of the server of FIG. 1.

Turning also to FIG. 2, there is shown the architecture of an example system 100', in the home server 1 (HS1) 100. This architecture and descriptions provided for home server 1 (HS1) 100 are also applicable to the home server 2 (HS2) 100a, with differences detailed below.

The system 100' is shown with its various components, and is not limited to residing in the home server 1 (HS1) 100, as some of the components, in any arrangement, may be external to the home server 1 (HS1) 100. Moreover, the system 100' may be distributed over multiple computers, servers, machines, and the like.

The system 100' includes processors (e.g., a Central Processing Unit (CPU) 202), linked to storage/memory 204. There is also storage media 206, and modules including network probing tool(s) or probe(s) 211, sniffer(s) 212, log analyzer(s) 213, a classifier 214, and a network interface 215. As used herein, a "module", for example, includes a component for storing instructions (e.g., machine readable instructions) for performing a process, and including or associated with processors for executing the instructions. All of the components 202, 204, 206 and 211-215 link to each other either directly or indirectly for electronic and/or data communication therebetween.

The CPU 202 performs the processes (methods) of the present invention. For example, the processors may include x86 Processors from AMD (Advanced Micro Devices) and Intel, Xenon® and Pentium® processors from Intel, as well as any combinations thereof. Additional processors, including hardware processors, storage/memory, modules and storage media may also be part of the system for performing the invention.

Figure 3:
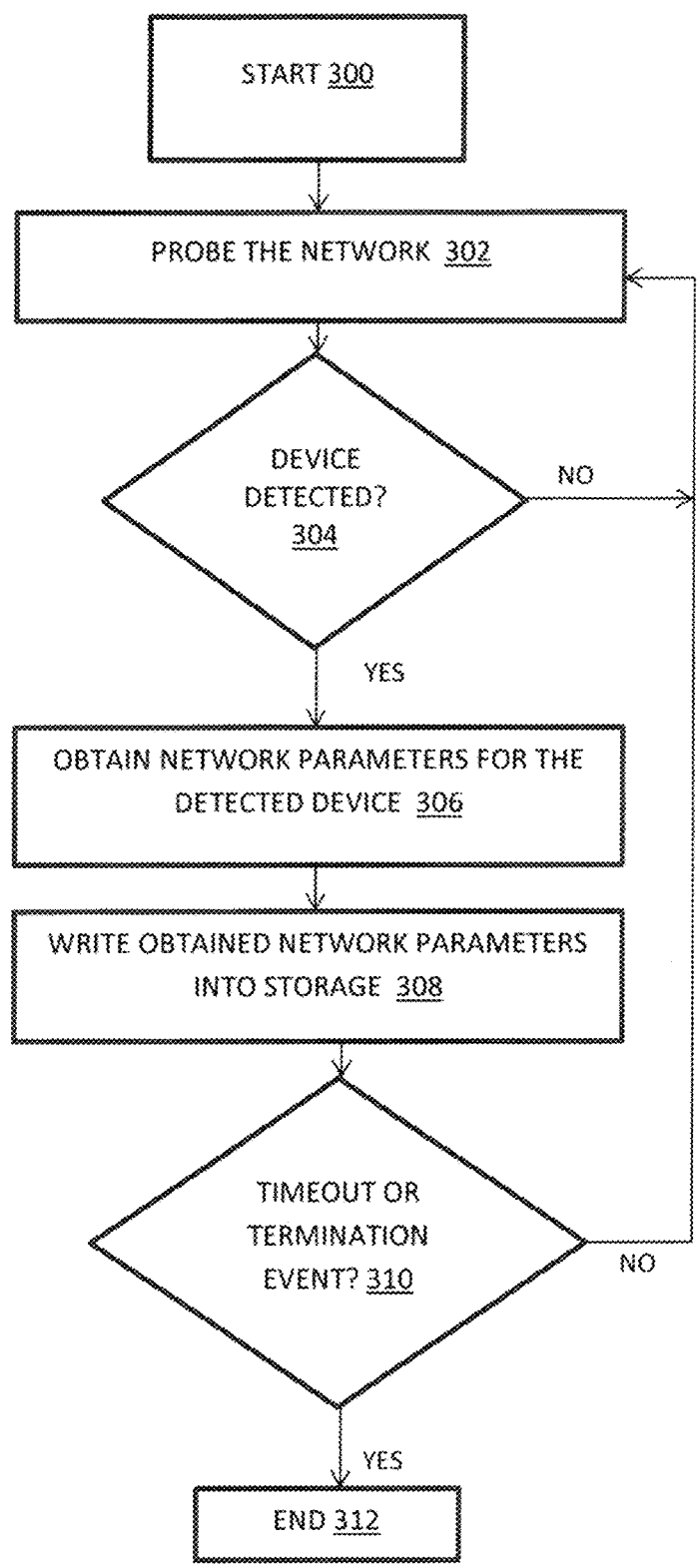
FIG. 3 is a flow diagram of a first process in accordance with embodiments of the invention; and, FIG. 4 is a flow diagram of a second process in accordance with embodiments of the invention.
Figure 4:
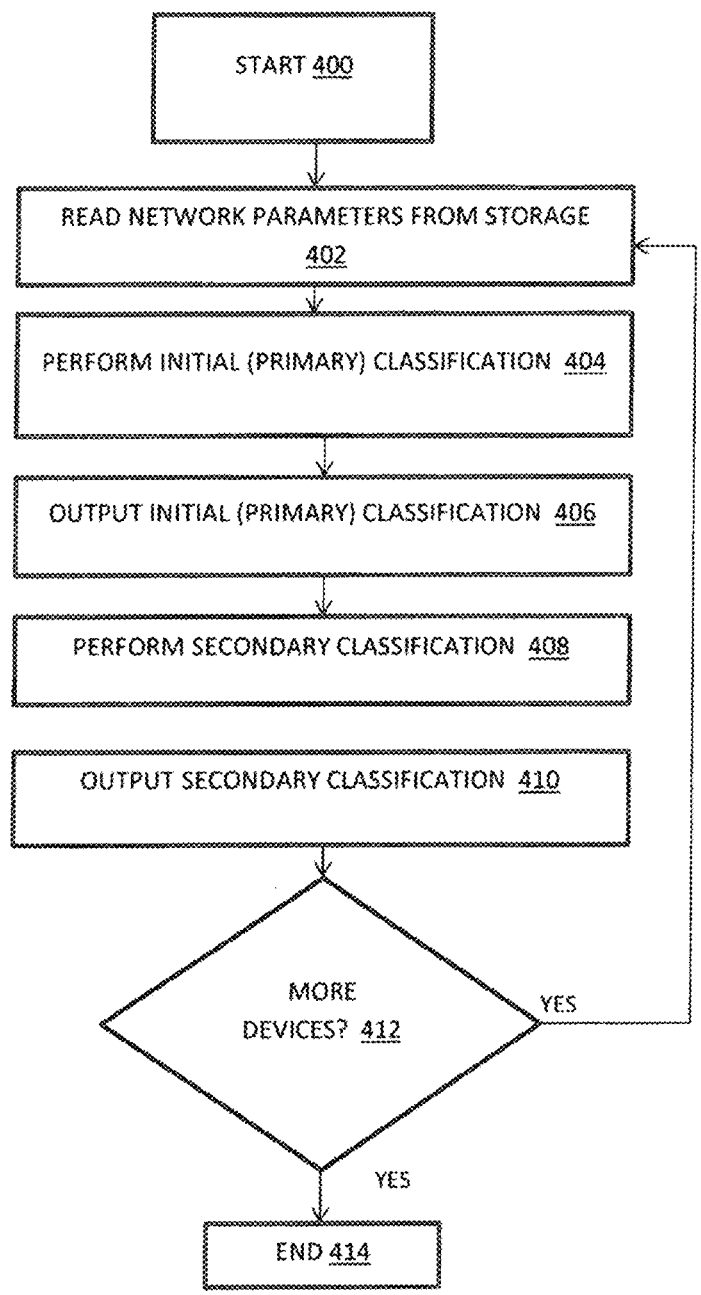

The storage/memory 204 stores machine-executable instructions executed by the CPU 202 for performing the processes of the invention, for example, those detailed in FIGS. 3 and 4, which when programmed accordingly into the CPU 202, control the storage media 206 and the modules 211-215, The storage/memory 204, for example, also provides temporary storage for the system 100'.

The storage 206 includes, for example, conventional storage media for storing data associated with the components 211-215.

The network probing tool(s) or probe(s) 211 actively probe for the devices 110 by sending connection requests to Internet Protocol (IP) addresses associated with each device 110a-110i. Example, network probing tool(s) or probe(s) 211 include, for example, tools such as nmap, an open source network scanner (e.g., as provided in https://nmap.org/), and netcat, a computer networking utility for reading from and writing to network connections using Transmission Control Protocol (TCP) or User Datagram Protocol (UDP) and with a list of features including port scanning, transferring files, and port listening (e.g., as provided in http://nc110.sourceforge.net/).

Sniffer(s) 212 function to monitor and obtain traffic and data associated therewith, which is transmitted to and from the devices 110. Example sniffer(s) 212 include wireshark, an open source packet analyzer (e.g., as provided in https://www.wireshark.org/), tcpdump, a packet analyzer (e.g., as provided in https://www.tcpdump.org/), and kismet, a network detector, packet sniffer, and intrusion detection system (e.g., as provided in https://www.kismetwireless.net/). The sniffer(s) 212, for example, perform by using a terminal access point (TAP) device or a Switched Port Analyzer (SPAN) port. Sniffers 212 are typically not present on the home server 2 (HS2) 100a, as due to being seated behind the gateway, the home server 2 (HS2) 100a is limited to probing performed by the network probing tools or probes 211.

Log analyzer(s) 213 serve to derive parameters from logs generated by various networked devices such as wireless access points, routers, security gateways (including firewalls and packet filters), load balancers, Domain Name Servers (DNS) servers, Dynamic Host Configuration Protocol (DHCP) servers and network proxies. Log Analyzers 213 are typically not present on the home server 2 (HS2) 100a, as due to being seated behind the gateway, the home server 2 (HS2) 100a is limited to probing performed by the network probing tools or probes 211.

The network probing tool(s) or probe(s) 211, sniffer(s) 212, log analyzer(s) 213, all function to detect the networked device 110, by identifying and obtaining the network parameters used by the detected device 110. The network parameters which may be identified and/or obtained by the network probing tool(s) or probe(s) 211, sniffer(s) 212, log analyzer(s) 213, include, for example, 1) one or more of the Internet Protocol (IP) addresses, including network addresses, discovered to be in use by a device 110 or the one or more of the fully qualified domain names identified to be in use by the device 110; 2) one or more of the application protocols, e.g., Internet Protocols (IP), identified as being used by the device 110; 3) the role in which the device 110 uses each of the application protocols, for example, as a client, as a server, or both as a client and a server, 4) the content length of the payload of the probing response (also referred to as the "content length" or "data length"), transmitted by the device 110, and determined by counting bytes in the payload or from the content-length portion of the header, e.g., Hypertext Transfer Protocol (HTTP) header, of the probing response; and, 5) the content of data related to messages sent or received by the device 110.

Additionally, the aforementioned network parameters, alone or in any combination, may be augmented with additional parameters. The additional parameters are, for example, further indicative of whether the device 110 acts as a client, as a server, or both, for the combination of network parameters.

The network address or addresses of a device 110, for example, include: Internet Protocol Version 4 (IPv4) address or addresses (e.g., as defined in Request for Comments (RFC) 791 and subsequent standards), Internet Protocol Version 6 (IPv6) address or addresses (e.g., as defined in RFC 1883 and subsequent standards), fully qualified domain name or names (e.g., as defined in RFC 1035 and subsequent standards), and the like.

The network protocols of a device 110, for example, include: Internet Control Message Protocol (ICMP) (e.g., as defined in RFC 792 and subsequent standards), Transmission Control Protocol (TCP) (e.g., as defined in RFC 793 and subsequent standards), User Datagram Protocol (UDP) (e.g., as defined in RFC 768 and subsequent standards), Stream Control Transmission Protocol (SCTP) (e.g., as defined in RFC 2960 and subsequent standards), and, ESP (e.g., as defined in RFC 1827 and subsequent standards), and the like.

The application protocols of a device 110, for example, include: HTTP (e.g., as defined in RFC 1945 and subsequent standards), File Transfer Protocol (FTP) (e.g., as defined in RFC 354 and subsequent standards), Simple Mail Transfer Protocol (SMTP) (e.g., as defined in RFC 821 and subsequent standards), Dynamic Host Configuration Protocol (DHCP) (e.g., as defined in RFC 1531 and subsequent standards), Domain Network System (DNS) Protocol (e.g., as defined in RFC 1035 and subsequent standards), Secure Sockets Layer (SSL)/Transport Layer Security (TLS) (e.g., as defined in RFC 2246 and former and subsequent standards), Internet Key Exchange (IKE) Protocol (e.g., as defined in RFC 2409 and former and subsequent standards), and the like.

Additionally, any combination of the aforementioned network parameters may be augmented with additional parameters, which relate to the data sent to or from the device 110. For example, certain application protocols employ banners or headers that are sent or received by the device 110. Examples of such data include various HTTP request and/or response headers or data contained in such headers. The data contained in the headers includes, for example, requested URL data, requested method data, content-length data, server data, origin data, referrer data, user-agent data, FTP header and banner data, SMTP header and banner data, data related to DNS, such as data contained within the DNS queries and responses, and the like.

The classification module 214 serves to classify the device 110 into groups of devices 110, based on the similarity of network parameters identified for each device 110. The classification module 214 includes a primary classifier 214a, which determines an initial class for the device 110, and a secondary classifier 214b, which performs further classification of the device 110.

The classifier 214 typically operates after device identification has been completed, but may begin at any time during the aforementioned identification, as performed by components 211-213 (detailed above). The classifier module 214, for example, performs its operations automatically. The classifier module 214, at the end of the secondary classification process (by the secondary classifier 214b), for example, outputs a list of categories for each classified device. For each category, the network parameters of each device are recorded, and stored, for example, in the storage 206.

The primary classifier 214a performs an initial classification of the devices 110 to obtain initial categories (classes) based on similarities in the collected network parameters. This classifier 214a analyzes the data associated with the identified device, and places the device into one or more classifications or classes. The classifications are, for example, predetermined by the system 100' and may be added to or subtracted from, for example, by a system administrator or the like.

The secondary classifier 214b further classifies the devices 110, which were initially classified by the primary classifier 214a, by performing a secondary classification on the devices belonging to at least one of the initial classes or classifications. The secondary classification is based on data returned by the device 110 after the module 214b has issued at least one application protocol specific request to the device 110 (which has been initially classified). For example, based on the initial classification, the secondary classifier 214b makes one or more application-specific requests to each initially classified device 110. Based on the response received from each device 110, one initial class of devices may be further classified (subclassified) into two or more subclasses.

For example, the secondary classifier 214b operates to create subclasses for devices which were initially in the same class after the first classification by the primary classifier 214a. The secondary classifier does this by issuing an HTTP request for the resource 'index.html' on each of the two devices.

Where the first device could return:
<html>
  <body>
    I am a doorbell
  </body>
</html>
and, the second device could return:
<html>
  <body>
    I am a teapot
  </body>
</html>

Based on the response above, the first device could be classified as a doorbell whereas the second device as a teapot.

The network interface 215 handles incoming and outgoing communications, both electronic and data, between the system 100' and the network(s) 50.

Attention is now directed to FIGS. 3 and 4, which show flow diagrams detailing computer-implemented processes and sub-processes in accordance with embodiments of the disclosed subject matter. FIG. 3 is a process for identifying devices, and FIG. 4 is a process for classifying the identified devices. Reference is also made to elements shown in FIGS. 1 and 2. The aforementioned processes and sub-processes are, for example, performed automatically and in real time.

The device identification process of FIG. 3 begins at a START block 300. At the START block 300, there is provided an Internet Protocol Range and Port List on the network 50, to probe. The process then moves to block 302, where the network 50 is probed, by module 211, to detect a device 110. To ensure that the devices 110a-110i on the LAN 50 are reachable, port forwarding is performed by the entity associated with the device 110a-110i in a router associated with the device 110a-110i. The home server 100, 100a sends active requests to ports on the network 50, to detect the various devices 110a-110i, linked to the network 50, which include, for example, sending connection requests to Internet Protocol (IP) addresses associated with each device 110a-110i. These connection requests include, for example, HTTP requests to establish communication with a networked device 110a-110i.

The process moves to block 304, where it is determined whether a device 110 has been detected. Should a device 110 not be detected, the process returns to block 302, from where it resumes.

At block 304, should a device 110 be detected, the process moves to block 306, where network parameters associated with the device 110 are obtained. The network parameters are obtained from the detected device by the system 100' of the Home Server 1 (HS1) 100, by one or more of: 1) probing for the parameters by network probing tools or probes 211; 2) sniffing, by sniffers 212; and 3) deriving the network parameters from logs generated by the device or by a server, to which the device is communicatively linked, such as a web server, by the log analyzers 213, and by the system of the Home Server 2 (HS2) 100a, by probing for the parameters, by network probing tools or probes 211, since home server 2 (HS2) 100a is outside of the network (LAN) 50 and can only probe open ports. The network 50 probing by the network tools or probes 211 includes the home server 100, 100a systems 100' sending GET Requests to open ports on the network (LAN) 50. Should there be a response to the GET Request or to the initialization of the TCP connection, the port is open and the port can be queried, for example, with binary protocols or other protocols, to identify the specific device, for example, the device identified is a washing machine 110g. The response (which is the probing response) to the GET Request is an HTTP response, including HTTP headers and a data portion. One of the HTTP headers is a content-length header, which specifies the length of the data portion. Network parameters may be identified and/or obtained from this probing response.

The network parameters, which may be identified and/or obtained by the aforementioned network probing tool(s) or probe(s) 211, and also, the sniffer(s) 212, and log analyzer(s) 213, include, for example, 1) one or more of the IP addresses, including network addresses, discovered to be in use by a device 110 or the one or more of the fully qualified domain names identified to be in use by the device 110; 2) one or more of the application protocols, e.g., Internet Protocols (IP), identified as being used by the device 110; 3) the role in which the device 110 uses each of the application protocols, for example, as a client, as a server, or both as a client and a server, 4) the content length of the payload of the probing response, transmitted by the device 110, and determined by counting bytes in the payload or from the content-length portion of the header, e.g., HTTP header, of the probing response; and, 5) the content of data related to messages sent or received by the device 110.

Additionally, the aforementioned network parameters, alone or in any combination, may be augmented with additional parameters. The additional parameters are, for example, further indicative of whether the device 110 acts as a client, as a server, or both, for the combination of network parameters.

The network address or addresses of a device 110, for example, include: IPv4 address or addresses (e.g., as defined in RFC 791 and subsequent standards), IPv6 address or addresses (e.g., as defined in RFC 1883 and subsequent standards), fully qualified domain name or names (e.g., as defined in RFC 1035 and subsequent standards), and the like.

The network protocols of a device 110, for example, include: ICMP (e.g., as defined in RFC 792 and subsequent standards), TCP (e.g., as defined in RFC 793 and subsequent standards), UDP (e.g., as defined in RFC 768 and subsequent standards), SCTP (e.g., as defined in RFC 2960 and subsequent standards), and, Encapsulating Security Payload (ESP) Protocol (e.g., as defined in RFC 1827 and subsequent standards), and the like.

The application protocols of a device 110, for example, include: HTTP (e.g., as defined in RFC 1945 and subsequent standards), FTP (e.g., as defined in RFC 354 and subsequent standards), SMTP (e.g., as defined in RFC 821 and subsequent standards), DHCP (e.g., as defined in RFC 1531 and subsequent standards), DNS (e.g., as defined in RFC 1035 and subsequent standards), SSL/TLS (e.g., as defined in RFC 2246 and former and subsequent standards), IKE (e.g., as defined in RFC 2409 and former and subsequent standards), and the like.

Additionally, any combination of the aforementioned network parameters may be augmented with additional parameters, which relate to the data sent to or from the device. For example, certain application protocols employ banners or headers that are sent or received by the device. Examples of such data include various HTTP request and/or response headers or data contained in such headers. The data contained in the headers includes, for example, requested URL data, requested method data, content-length data, server data, origin data, referrer data, user-agent data, FTP header and banner data, SMTP header and banner data, data related to DNS, such as data contained within the DNS queries and responses, and the like.

The process moves to block 308. Here, the network parameters obtained for the device 110 are written into storage and databases therein, such as the storage 206, for storage.

The process moves to block 310, where it is determined whether the process has timed out or been terminated. If yes, the process moves to block 312, where it ends. If no, the process returns to block 302 where it resumes, to detect other devices 110 on the network.

The process of FIG. 3 and blocks 300-312 is such that detection of device(s), while typically performed from a single location, such as the home server 100, may be performed from multiple locations along the network(s) 50, such as computers, servers and the like linked to the network(s) 50. By performing detection of devices from multiple locations, this allows for the detection of more devices than when performing discovery from a single location, due to having access to more networks as well as being able to avoid any other limits such as rate limiting that could hinder discovery from a single location.

The process of FIG. 3 and blocks 300-312 can be performed sequentially or in parallel, and from single or multiple computers, servers, such as the home server, 100 and the like. The use of multiple computers could, in some cases, for example, allow higher levels of parallelism, producing faster results (output identifying the detected device(s)).

Additionally, by process of FIG. 3 and blocks 300-312, using multiple detection methods, as detailed above, such as probing, sniffing and log analysis, and/or from multiple locations and/or using multiple computers, the multiple detected and obtained data sets may be, for example, combined, to provide a single combined detected and obtained data set containing the combined device detection results.

With network parameters for one or more devices being obtained and/or stored in a database in the storage 206, the classification process of FIG. 4 occurs.

The classification process begins at a START block 400. This classification process may be performed in sequence, one device after another, or in parallel, one of more devices analyzed contemporaneously, including simultaneously. The process moves to block 402, where the network parameters for the detected device are read by the classifier 214.

The process moves to block 404, where the read parameters are initially classified by the primary classifier 214a into classes, initially established by the system administrator or the like. This initial classification is made based on similarity of network parameters of the device, to other already analyzed devices.

The primary classifier 214a is such that, for example, the process is performed automatically. The process of primary or initial classification is such that two or more identified networked devices may be classified in the same initial class of devices, provided that they do one or more of: 1) use the same application protocols; 2) act in the same function or role for the set of application protocols used by the device 110; and 3) for each application protocol, a) the content length of data of the payload of the probing response from the device falls in the same length range, and b) the content of data extracted from the messages the device 110 sends and/or receives is substantially the same.

One factor typically relied on by the primary classifier 214a is the length of the probing response from the device 110a-110i, which is the length of the content (data) returned in response to the aforementioned probing. By analyzing the length of the probing response by the primary classifier 214b, by counting bytes in the payload or from the content-length portion of the header, e.g., HTTP header, of the probing response, the amount of content which needs to be analyzed by the secondary classifier 214b is reduced, as opposed to looking at all of the content. Content length evaluation is on the order of seconds, which is a substantial time saving from content analysis, which is time consuming and on the order of hours since there is a need to analyze all the replies as opposite to a certain class. Since it is time consuming to analyze all the content of probing a large IP range, an initial or primary classification divides the IP addresses into different classes according to content length. Then, the secondary classification is done only on selected classes to distinguish which of those are the IoT devices and which are not.

In accordance with the primary classification, as performed by the primary classifier 214a, two devices, for example, could be deemed to belong to the same initial class of devices provided that there is one or more of: 1) both devices use HTTP and FTP; 2) if both devices use HTTP, they both act as a server; 3) if both devices use HTTP, they both act as a client; 4) both devices respond with an HTTP "Server" header of length 18; 5) the content of the "Server" headers is similar, where one device responds with Server: WEBXXX2.a, and the other device responds with Server: WEBXXX2.b; 6) both devices respond with an HTTP "Content-Length" header; 7) the content of said "Content-Length" headers falls in the same length range, where one device responds with: Content-Length: 607, and the other device responds with: Content-Length: 608, and where the length range is configured to be 600-650.

The process moves to block 408, where the initial class is outputted by the primary classifier 214a.

The process moves to block 410, where secondary classification is performed by the secondary classifier 214b, for example, automatically, This secondary classification is achieved, for example, by the secondary classifier 214b interacting with each device 110. This interaction includes, one or more application-specific requests being made to each such device and, based on the response from the respective device 110, one initial class of devices could be subclassified into two or more subclasses of devices.

For example, the two aforementioned devices could be classified from one class into two subclasses, by the secondary classifier 214b issuing an HTTP request for the resource 'index.html' on each of the two devices, as follows:

Where the first device could return:
<html>
<body>
  I am a doorbell
</body>
</html>
And the second device could return:
<html>
<body>
  I am a teapot
</body>
</html>

Based on the response above, the first device could be classified as a doorbell in a separate subclass, whereas the second device as a teapot in another separate subclass.

The process moves to block 410, where the secondary classification (class) for the device 110 is outputted. The output is, for example, a list of categories, and for each category the network parameters of each device in that category.

Optionally, for the outputted class and/or subclass for the requisite device, additional information related to the subclass may be requested, as there may be multiple, e.g., two, IoT devices 110a-110i, whose associated websites return the same content length as a response (e.g., in the payload and/or content length header) to the probing request. In this case, further classification is necessary, and is performed, for example, by the secondary classifier 214b. This secondary classification is performed, for example, by sending proprietary requests (e.g., zero or more requests), such as TCP requests containing vendor specific data or http requests to vendor specific URLs, to the aforementioned devices, that could not be classified based on website content.

For example, in the case where there are two different IoT devices that return websites with the same size, but there is nothing significantly differentiating in the content itself, each of the devices are queried via the aforementioned proprietary requests to determine the identity or type (e.g., laptop computer, wearable, washing machine, etc.) of the device. In such a case, the result of this classification could be directed to one or more entities, human or machine, who could select one or more representatives from that category to perform additional, and possibly manual, research, so as to better describe the category. Moreover, the work of such a researcher would be greatly reduced, as the researcher would only need to perform his research on a small number of representative members of the category.

The process moves to block 412, where it is determined whether there are more devices for classification. If yes, the process moves to block 402, from where it resumes. If no, the process moves to block 414, where it ends.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computer-implemented method, for detecting a device on a network, comprising:
   probing the network to obtain at least one network parameter from at least one device along the network;
   receiving at least one response to the probing the network, the at least one response including a payload of a content length, the content length defining the at least one network parameter;
   performing an initial classification into at least one category of the at least one device, based on the content length of the at least one response from the at least one device; and,
   performing a secondary classification on the at least one device in the at least one initial category based on data returned by the at least one device after issuing at least one application protocol specific request to the at least one device.

2. The computer-implemented method of claim 1, wherein the probing the network includes: sending at least one active request to ports associated with the at least one device to establish communication with the at least one device.

3. The computer-implemented method of claim 2, wherein the at least one active request includes one or more Hypertext Transfer Protocol (HTTP) requests.

4. The computer-implemented method of claim 2, wherein the probing the network additionally includes: sending at least one GET request to the ports associated with the at least one device.

5. The computer-implemented method of claim 4, wherein in response to the GET request being received, querying the at least one device through the associated port with protocols for identifying the device by its type.

6. The computer-implemented method of claim 4, wherein the probing includes applying probing tools to obtain the at least one network parameter.

7. The computer-implemented method of claim 4, wherein the probing includes one or more of: a) applying probing tools; b) sniffing; or c) applying log analyzers, to obtain the at least one network parameter.

8. The computer-implemented method of claim 7, wherein the applying log analyzers to obtain the at least one network parameter includes analyzing logs generated by one or more of: routers, wireless access points, security gateways, firewalls, packet filters, load balancers, Domain Name Servers (DNS), Dynamic Host Configuration Protocol (DHCP) servers, and network proxies.

9. The computer-implemented method of claim 1, wherein the content length is determined by at least one of:
   counting the bytes in the payload of the at least one response; or
   obtaining the content length from a content-length portion of a header of the at least one response.

10. The computer-implemented method of claim 1, wherein the performing the initial classification further includes establishing a classification for the at least one device by one or more of:
    determining the application protocol used by the at least one device;
    determining the function of the application protocol for the at least one device;
    determining whether the content length of the probing response is within a predetermined range; and,
    the content of the probing response.

11. The computer-implemented method of claim 1, wherein the application specific protocol request includes a Hypertext Transfer Protocol (HTTP) request.

12. The computer-implemented method of claim 11, wherein the HTTP request is for a resource associated with the at least one device.

13. The computer implemented method of claim 1, wherein the secondary classification is based on website content received from the at least one response to the probing the network.

14. The computer-implemented method of claim 13, wherein the secondary classification additionally comprises: sending one or more of: 1) Transmission Control Protocol (TCP) requests containing vendor specific data, or 2) HTTP requests to vendor specific Uniform Resource Locator (URL), to determine the type of the at least one device from the website associated with the at least one device.

15. A computer system for detecting and classifying a networked device comprising:
    a computerized processor coupled to a memory, wherein the processor is configured for:
      probing the network to obtain at least one network parameter from at least one device along the network;
      receiving at least one response to the probing the network, the at least one response including a payload of a content length, the content length defining the at least one network parameter; and,
      performing an initial classification into at least one category of the at least one device, based on the content length of the at least one response from the at least one device; and,
      performing a secondary classification on the at least one device in the at least one initial category based on data returned by the at least one device after issuing at least one application protocol specific request to the at least one device.

16. The computer system of claim 15, wherein the probing the network includes one or more of: a probing tool, a sniffer, and a log analyzer.

17. The system of claim 15, wherein the receiving the at least one response to the probing the network is configured for determining the content length by at least one of:
   counting the bytes in the payload of the at least one response; or
   obtaining the content length from a content-length portion of a header of the at least one response.

18. The computer system of claim 15, wherein the performing the initial classification includes establishing a classification for the at least one device by one or more of:
   determining the application protocol used by the at least one device;
   determining the function of the application protocol for the at least one device;
   determining whether the content length of the probing response is within a predetermined range; and,
   the content of the probing response.

19. The computer system of claim 15, wherein the performing the secondary classification includes receiving website content received from the at least one response to the probing the network.

20. A computer usable non-transitory storage medium having a computer program embodied thereon for causing a suitably programmed system to discover and classify a device on a network, by performing the following steps when such program is executed on the system, the steps comprising:
   probing the network to obtain at least one network parameter from at least one device along the network;
   receiving at least one response to the probing the network, the at least one response including a payload of a content length, the content length defining the at least one network parameter;
   performing an initial classification into at least one category of the at least one device, based on the content length of the at least one response from the at least one device; and,
   performing a secondary classification on the at least one device in the at least one initial category based on data returned by the at least one device after issuing at least one application protocol specific request to the at least one device.

* * * * *